Feb. 19, 1924.

K. BENNEWITZ 1,484,289

ANEROID BAROMETER

Filed Aug. 30, 1921

Inventor:
Kurt Bennewitz

Patented Feb. 19, 1924.

1,484,289

UNITED STATES PATENT OFFICE.

KURT BENNEWITZ, OF CHARLOTTENBURG, NEAR BERLIN, GERMANY, ASSIGNOR TO THE FIRM OF OPTISCHE ANSTALT C. P. GOERZ AKTIENGESELLSCHAFT, OF FRIED-ENAU, NEAR BERLIN, GERMANY.

ANEROID BAROMETER.

Application filed August 30, 1921. Serial No. 496,941.

(GRANTED UNDER THE PROVISIONS OF THE ACT OF MARCH 3, 1921, 41 STAT. L., 1313.)

*To all whom it may concern:*

Be it known that I, KURT BENNEWITZ, a citizen of the German Republic, and resident of Charlottenburg, near Berlin, Germany, have invented certain new and useful Improvements in and Relating to Aneroid Barometers (for which I have filed an application in Germany May 29, 1917, Patent No. 307,126), of which the following is a specification.

The value of aneroid barometers particularly as height measuring instrument on aircraft is highly diminished by the elastic inertia of the exhausted boxes. The term elastic inertia designates the property of elastic bodies to undergo besides an abrupt elastic deformation on variation of exterior circumstances a slow deformation of minor degree progressing in time so that the final shape is only reached within a longer period of time. So aneroid boxes undergo on variation of air pressure an immediate elastic deformation corresponding to the pressure variation and besides this abrupt deformation they undergo a slight secondary change progressing in time and gradually disappearing. This elastic inertia change progressing in time falsifies the indication of aneroid barometers, and it is the purpose of this invention to overcome this deficiency resulting from the elastic inertia of the exhausted boxes. It has been attempted to overcome this deficiency by artificially aging the boxes. However it has only been possible to somewhat reduce in this way the incorrectness of indications of the instrument without however being able to secure sufficient correctness.

In accordance with this invention the deficiency is substantially eliminated by coordinating a plurality of aneroid boxes in such manner that the several boxes compensate each other for the elastic inertia. This can be done without at the same time neutralizing the actuation of the indicating member of the instrument.

Assuming two boxes which have the same elastic inertia but different amplitudes for the same pressure variation to be interconnected so as to counteract each other, an instrument with two such boxes will be free from incorrectness of indication caused by elactic inertia. Instead of two boxes a greater number of boxes may be combined provided that the boxes mutually compensate the influence of elastic inertia inherent to each of them.

The effect of compensation for elastic inertia of the aneroid boxes can be secured by various ways of interconnecting the boxes. Two embodiments are illustrated on the accompanying drawing.

Figure 1:
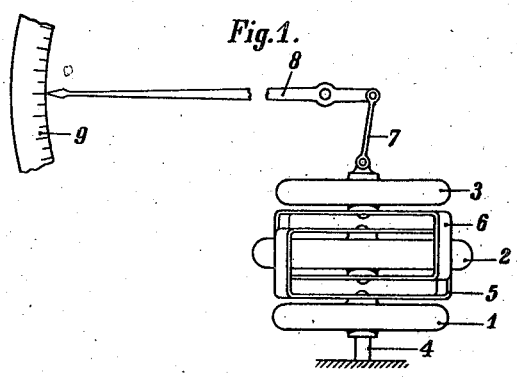
Figures 1 and 2 show one arrangement of the boxes in side elevation and in plan.
Figure 2:
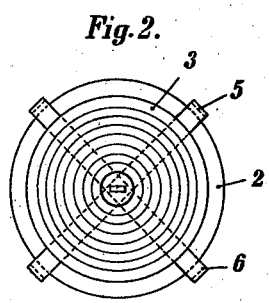

In Fig. 1 three aneroid boxes are designated with the numerals 1, 2, 3. The lowermost box is mounted on a support or foot 4 and carries a frame 5 having fastened thereto the upper side of box 2 which carries frame 6 on which the third box 3 is mounted. The resulting amplitude of the box system is communicated by link 7 to pointer 8 the position of which can be read on scale 9.

The boxes 1, 2, 3 form two groups, the one group 1, 3 operating the indicating member or pointer 8 in one direction, and the other group formed of box 2 in opposite direction. If the boxes would be so selected that the said elastic deformation effect of boxes 1, 3 on the one hand and box 2 on the other hand on pointer 8 for the same change in air pressure would be the same, then no height indication could be derived from the instrument. If, however, the boxes are so selected that the deformation effect on air pressure variation is different for both groups of boxes then the difference of the elastic deformation effect on the pointer forms a measure for the height difference corresponding to the air pressure variation in question. This indication would be falsified by the effect of the said elastic inertia of the boxes of the groups provided that the elastic inertia effect on the pointer is likewise different for the two groups. It is, however, possible to select the boxes of the two groups in this way that the elastic inertia effects of the groups on the pointer neutralise each other, whereas at the same time the elastic deformation effects of the two groups on the pointer do not neutralise each other, and the essence of the invention consists therein that boxes of different elastic properties are combined with each other in two groups and connected to an indicating member so as to actuate same in opposite directions in such a way that the two groups are positively operative on the indicating member with the difference of their elastic deformation.

Figure 3:
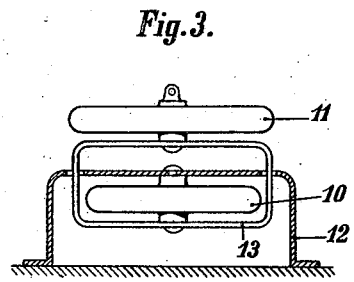
Figure 3 shows a modified box arrangement.

In the embodiment shown in Fig. 3 two boxes 10, 11 are combined with each other; the one 10 is suspended on a frame 12 and carries a frame 13 on which the second box 11 is mounted which is assumed as actuating the indicating means.

Preferably artificially aged boxes are used.

In order to select boxes in accordance with the invention, one can examine a large number of boxes of large diameter having thick walls and a number of boxes of smaller diameter having thinner walls by subjecting them after a long period of rest to pressure for say 10 minutes and thereafter suddenly releasing the pressure. If one now compares, by means of a suitable indicating mechanism at a special moment for instance 15 seconds after the sudden pressure release, the shape of the boxes with their shape before the pressure was applied, then the difference of indications is indicative for the effect of the elastic inertia and boxes which show the same elastic inertia determined in this way may be combined for the purpose of the invention in the manner indicated on the drawing.

However I do not limit myself to the combination of boxes of equal elastic inertia because other methods of combining boxes of different elastic properties may be used which do not require that the boxes connected for combined operation have the same elastic inertia.

What I claim is:

An aneroid barometer particularly for indicating the height of air craft comprising a plurality of aneroid boxes of different elastic properties interconnected with each other and with an indicating member, the boxes forming two groups operating the indicating member in opposite directions, the boxes of each group being so selected that the elastic deformation effect on the indicating member is different for the two groups whereas the elastic inertia effects neutralise each other.

In testimony whereof I have signed this specification in the presence of two subscribing witnesses.

DR. KURT BENNEWITZ.

Witnesses:
EBERHARD FAEHLING,
FRITZ SCHMIDT.